United States Patent Office 2,754,096
Patented July 10, 1956

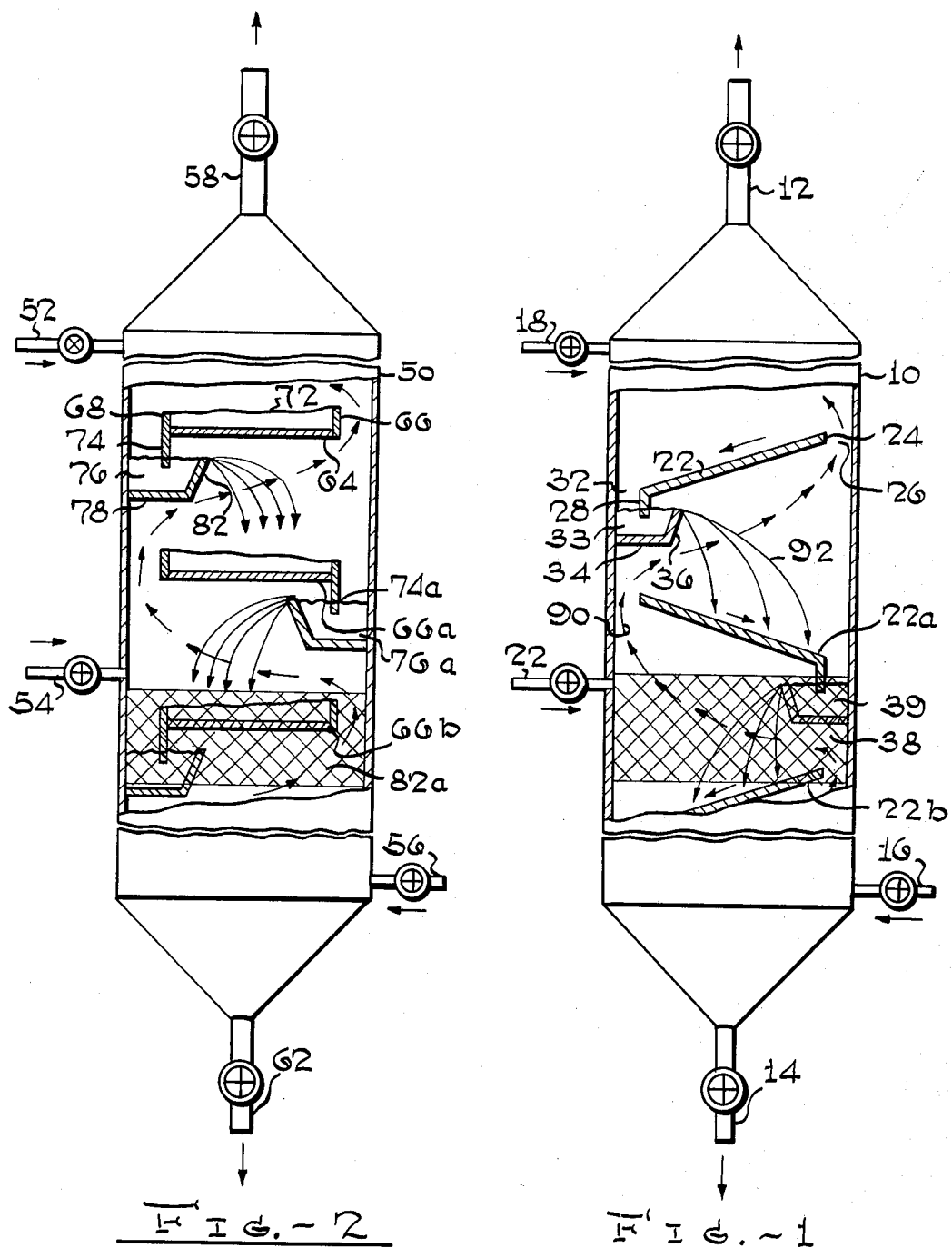

2,754,096
LIQUID-GAS CONTACTING DEVICE

Albert B. Welty, Jr., Mountainside, N. J., assignor to Esso Research and Engineering Company, a corporation of Delaware Application October 1, 1952, Serial No. 312,447

2 Claims. (Cl. 261—97)

This invention relates to an improved method and apparatus for countercurrently contacting vapors and liquids and is more particularly concerned with a fractionation zone for contacting upflowing vapor with downflowing liquid.

In liquid-gas contacting towers it is desirable to operate at high velocities in order to get high capacity and at the same time to obtain effective transfer of material from one phase to the other. The maximum velocities or gas rates for any liquid rate are limited by flooding of the trays in a bubble tray type tower, and/or excessive liquid entrainment from tray to tray. Flooding of the trays leads to flooding of the tower and liquid carryover from the top of the tower. Flooding causes excessive entrainment of liquid and this impairs the contacting efficiency of the tower.

Packed towers in small diameters generally give good efficiencies, but when larger diameter towers, such as those used commercially, are employed, channelling occurs and overall efficiency becomes poor. In addition, when the gas and liquid phases are made to flow countercurrently as is normally practiced in packed columns or towers, the liquid must drop through or flow against the rising gas or vapor and entrainment then limits the capacity of the tower.

The present invention overcomes both of the above objections. According to the present invention the tower is preferably packed with appropriate packing such as Raschig rings, Beryl saddles, deformed wire lath, wire mesh, etc. Within the tower there is arranged a series of solid or imperforate plates arranged in a horizontal or slanting or sloping position. These plates provide for collecting the liquid and conducting it to the stage below by means of a tray from which the liquid spills. The upwardly flowing gas passes substantially in a horizontal direction between the solid plates and thus minimizes entrainment of liquid droplets upward. Liquid from each tray flows or falls onto the surface of the packing between the plates and the liquid is given some horizontal component by the horizontally flowing gas.

In the drawing:

Fig. 1 represents one form of the present invention which includes a tower provided with slanting solid plates; and Fig. 2 represents another form of the present invention which includes a tower provided with solid plates arranged substantially in a horizontal position.

Referring now to Fig. 1 of the drawing, the reference character 10 designates a cylindrical vertical vessel provided with a top outlet 12 for gases or vapors and a bottom outlet 14 of liquid. Line 16 is provided for introducing gases or vapors into the bottom portion of the vessel 10 and line 18 is provided for introducing a liquid into the upper portion of the vessel 10. An alternate line 22 is provided which may be used for introducing vapors into an intermediate portion of the vessel 10. The vessel is provided with a series of vertically spaced solid or imperforate plates 22 forming vertically spaced contacting chambers or zones. The plates 22 are arranged in a sloping or slanting position to direct the liquid from one side of the vessel to the other side of the vessel. The next lower plate 22a slants in the opposite direction to direct liquid from the one side of the vessel to the other. The next plate 22b slopes in a direction opposite to that of plate 22a but in the same direction as plate 22.

The plates 22 extend entirely across the cylindrical vessel 10 as viewed from front to back in Fig. 1 to form partitions and to cause the desired flow of gas and liquid to the contacting vessel 10. Viewed from side to side in Fig. 1 the plates 22 do not extend entirely across the vessel 10. The upper end 24 of plate 22 is spaced from the wall of the vessel 10 forming passageway 26 for upflowing gas. The passageway so formed is a portion of a circle bounded by a chord and an arc. The lower end of the plate 22 has a downwardly extending sealing leg 28 spaced from the wall of the vessel 10 to form a similar arcuate shaped passageway 32 for the downflowing liquid. While a particular shape of plates 22 has been described and shown, this is by way of illustration only and different shapes producing the same result may be used. The leg 28 extends below the level of liquid contained in a well 33 formed from a horizontal imperforate member 34 extending inwardly from the wall of the vessel 10 and spaced below the bottom of leg 28 to form a reservoir for liquid. The well further includes a vertically arranged wall 36 which is solid or imperforate and arranged to the right of the sealing leg 28 and also extends above the lower portion of the sealing leg to form the well or reservoir 33 for the liquid. Preferably the wall 36 is shown as slanting or inclined from the vertical. The well 33 is also an arc shaped portion formed by the chord of a circle.

The vessel is preferably packed with appropriate packing such as Raschig rings, Beryl saddles, deformed wire lath, wire mesh, etc. The packing is diagramatically shown at 38.

As above pointed out the next lower imperforate plate 22a is also arranged in a sloping or slanting position but slopes in the opposite direction so as to flow liquid overflowing from well 33 to the opposite portion of the vessel 10 into the next lower well 39 which is similar in construction to the well 33 above described. The next lower plate 22b slopes in the opposite direction from plate 22a but in the same direction as the first plate 22 above described. While only a small number of plates and wells have been shown in Fig. 1, it is to be understood that this is for illustration only and the number of plates and wells may be varied as desired.

Referring now to Fig. 2 there is shown a modification in which the imperforate plates are arranged in a horizontal position as distinguished from the sloping position shown in Fig. 1. The vessel 50 has liquid inlet lines 52 and 54 and gas line 56 which are similar to the liquid and gas lines described in connection with Fig. 1. The vessel 50 has a top gas outlet 58 and a bottom liquid outlet 62. The plates 64 are vertically spaced to form a series of contacting zones or chambers. As viewed from front to back of Fig. 2 the plates 64 extend entirely across the vessel to form a partition but as viewed from side to side the plates are smaller dimensions than the width of the vessel to provide passageway for gas and liquid.

The top plate 64 is provided with an upstanding vertical member 66 at the right hand side of Fig. 2. At the other side the plate 64 is provided with another upstanding member 68 which forms a weir. The top of the weir at 68 is lower than the top of the vertical member 66 in order to insure that all the liquid flows over the weir and not back over vertical member 66. The upstanding portions 66 and 68 extend from front to back entirely across the vessel 50 to form a reservoir for liquid 72. The left hand portion of plate 64 is provided with a downwardly extending sealing leg 74 which extends across the vessel 50 from front to back. The sealing leg extends into well 76 formed by an inwardly extending horizontal imperforate plate 78 and a vertical slanting member 82 arranged at the right of the sealing leg 74. The construction of well 76 is similar to well 33 described in connection with Fig. 1.

The next lower plate 66a is similar to the imperforate plate 66 but the sealing leg 74a is arranged on the other side of the vessel to extend down into well 76a which is similar to well 76 but arranged on the opposite side of the vessel. The next lower plate 66b is similar in construction and arranged to the first plate member 66 above described. The entire vessel 50 is packed with appropriate packing such as described in connection with Fig. 1. The packing is diagrammatically shown at 82 in Fig. 2 for only a section of the vessel.

The operation of the vessel shown in Fig. 1 will now be described in connection with an absorption process where it is desired to recover certain vapors or gases from a gaseous mixture. One such example is a process for recovering pentane and higher hydrocarbons from a gaseous mixture including methane, ethane and higher hydrocarbons. The gaseous mixture is introduced through line 16 into the bottom of the contacting tower and flows generally upward through the vessel countercurrent to the liquid which is introduced at the top of the tower. The absorption liquid is any suitable liquid but in the particular example an absorber oil such as gas oil is used and is introduced into the upper portion of tower 10 through line 18. The liquid flows or works its way down through the packing of the tower from plate to plate and flows down the first imperforate slanting or sloping plate 22 to the well 33. In this downward passage over the packing material the fresh liquid contacts the gas which has been substantially denuded of the higher boiling hydrocarbons.

The absorption liquid then overflows from well 33 over the weir 36 and flows or drops down through the packing to the next lower plate 22a. In its downward passage over the packing the liquid is contacted with the gas to be treated. The flow of gas is essentially in a horizontal direction between the imperforate plates 22 and because of the higher velocity possible with the present invention the liquid is given some horizontal component by the horizontally flowing gas. The liquid overflowing well 33 is spread out over a greater surface of the packing by the horizontally flowing gas. The gas blows the liquid in a more or less horizontal direction from one part of the packing to the next. This repeatedly creates new liquid surface and repeatedly causes the liquid within a given droplet to get well mixed. This results in excellent mass transfer from the liquid to the gas and from the gas to the liquid thus rapidly approaching equilibrium in each stage, which is the ultimate in efficiency. This intensity of contacting action or exchange or rate of reaching equilibrium cannot be equalled by an ordinary packed tower without internal elements because the gas and liquid must then flow countercurrently and entrainment then limits the rate of gas flow and therefore the energy available for dissipating the liquid and continually creating new surface. In the present case high velocity of gas can be used because of its direction. Moving substantially horizontally it has only a limited effect on the flow of liquid downward due to gravity.

The flow of gas is shown by the broken lines 90 provided with arrows and the liquid flowing from the well 33 is shown diagrammatically as a series of continuous lines 92. The liquid in well 33 forms a seal to prevent gas from short circuiting and flowing through space 32 above well 33. The remaining wells also form liquid seals. Because the gas flows substantially horizontally between the plates the tendency toward entrainment of liquid droplets upwardly through the vessel is minimized. The packing causes efficient contacting between the gas and the liquid and due to the particular arrangement, the velocity of the gas flowing through the vessel is high to give high capacity and good contact between the gas and liquid. By the time the gas reaches the passageway 26 it is substantially free of entrained liquid.

The liquid flows down to the next lower well 39 from which it overflows and is contacted with gas in a manner similar to that above described. As the liquid flows down through the vessel it becomes richer in the pentane and higher hydrocarbons and it contacts the fresher gas which contains more of the pentane and higher hydrocarbons than exist at the top of the vessel to give true countercurrent action. The fat absorber liquid is withdrawn from the bottom of the vessel 50 through line 14 and the gas substantially free of pentane and higher hydrocarbons is withdrawn through top outlet 12 through the top of the vessel 10.

When using the tower 10 as a fractionating tower the vaporous or liquid feed is introduced through line 22 and the temperatures and pressures of the vapors flowing upwardly in the vessel 10 are adjusted to obtain fractionation of the vapors. For example, if a hydrocarbon mixture is to be fractionated, heat is usually supplied to the bottom of the fractionation zone to vaporize the constituents and as they pass upwardly and are fractionated the condensed liquids become more volatile and the liquid phase at any portion of the tower contains dissolved or condensed constituents of the vaporous feed. Because of the particular construction higher velocities are possible in a tower shown in the drawings than is possible with conventional fractionating equipment or towers. During fractionation the higher boiling hydrocarbon constituents flow downward through the tower and are withdrawn from the bottom of the tower through outlet line 14. The fractionated vapors comprising the lower boiling constituents pass overhead from the top of the tower through line 12.

The operation of the apparatus shown in Fig. 2 is substantially the same as that given for the apparatus shown in Fig. 1. While the contacting apparatus has been described in connection with absorption and fractionation it is to be understood that the invention may be used for any other gas-liquid contacting problem where it is desired to effect an exchange of material between the two phases such as, for example, in extractive distillation.

Conventional bubble cap towers are operated at velocities ranging from about ½ to 5 ft./sec. based on the horizontal cross-sectional area of the tower. This packed tower with baffle plates as described will run at velocities up to about 12 ft./sec. based on the horizontal cross-sectional area of the tower before entrainment becomes limiting. Thus capacity is increased at least twofold. Actual gas velocity at the place where gas contacts the liquid may be as high as 20 to 30 ft./sec. compared to about 1–3 in an ordinary packed tower.

What is claimed is:

1. Apparatus of the character described including a vertical cylindrical tower, a plurality of vertically spaced imperforate plates forming contacting chambers in said tower, said plates being inclined from the horizontal and extending from tower wall to tower wall in one direction to form solid partitions and having arcuate end portions cut away at the top and bottom portions of said inclined plates to provide passageways, a liquid reservoir arranged below the lower cut away portion of each of said plates, each of said plates at its lower cut away portion having a depending seal leg for immersion in said liquid reservoir, adjacent plates being inclined in opposite directions, adjacent reservoirs being arranged on opposite sides of said tower, packing in said tower and means for introducing gasiform and liquid material to said tower.

2. Apparatus of the character described including a vertical cylindrical tower, a plurality of solid partition plates vertically spaced in said tower, said partitions being arranged at an angle to the horizontal with adjacent partitions being inclined in opposite directions, each of said plates at its upper and lower ends being cut away to provide passageways, a reservoir arranged below the lower end of each plate with adjacent reservoirs being arranged on opposite sides of said tower, each of said plates at its lower end being provided with a sealing leg extending into its adjacent reservoir and packing material in said tower.

References Cited in the file of this patent

UNITED STATES PATENTS

| | | |
|---|---|---|
| 147,624 | Fenn | Feb. 17, 1874 |
| 313,287 | Cochrane | Mar. 3, 1885 |
| 419,350 | Piedra | Jan. 14, 1890 |
| 545,392 | Tracy | Aug. 27, 1895 |
| 1,317,688 | Davenport | Oct. 7, 1919 |
| 1,463,782 | Armstrong | Aug. 7, 1923 |
| 2,306,192 | Spiselman et al. | Dec. 22, 1942 |
| 2,632,638 | Turner | Mar. 24, 1953 |
| 2,646,266 | Lockwood | July 21, 1953 |